United States Patent
Luo et al.

(10) Patent No.: US 8,200,086 B2
(45) Date of Patent: Jun. 12, 2012

(54) STORAGE AREA NETWORK EXTENSION OVER PASSIVE OPTICAL NETWORKS USING PARALLEL SIGNAL DETECTION

(75) Inventors: Yuanqiu Luo, Hightstown, NJ (US); Si Yin, Kearny, NJ (US); Jianjun Yu, Princeton, NJ (US); Lei Zong, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 1059 days.

(21) Appl. No.: 12/044,417

(22) Filed: Mar. 7, 2008

(65) Prior Publication Data
US 2009/0067839 A1 Mar. 12, 2009

Related U.S. Application Data

(60) Provisional application No. 60/971,369, filed on Sep. 11, 2007.

(51) Int. Cl.
*H04J 14/00* (2006.01)
(52) U.S. Cl. ............... 398/58; 398/43; 398/76; 398/140
(58) Field of Classification Search .................... 398/76, 398/43, 58
See application file for complete search history.

(56) References Cited

U.S. PATENT DOCUMENTS

| | | | | |
|---|---|---|---|---|
| 5,596,436 A * | 1/1997 | Sargis et al. | | 398/76 |
| 6,757,767 B1 * | 6/2004 | Kelleher | | 710/107 |
| 6,763,193 B1 * | 7/2004 | Chand et al. | | 398/76 |
| 7,200,317 B2 * | 4/2007 | Reagan et al. | | 385/139 |
| 7,733,870 B1 * | 6/2010 | Liu et al. | | 370/395.2 |
| 2005/0129400 A1 * | 6/2005 | Kim et al. | | 398/67 |
| 2005/0175341 A1 * | 8/2005 | Ovadia | | 398/43 |
| 2006/0115271 A1 * | 6/2006 | Hwang et al. | | 398/72 |
| 2006/0277434 A1 * | 12/2006 | Tsern et al. | | 714/17 |
| 2007/0133987 A1 * | 6/2007 | Xu et al. | | 398/67 |
| 2008/0063397 A1 * | 3/2008 | Hu et al. | | 398/43 |
| 2008/0166129 A1 * | 7/2008 | Luo et al. | | 398/87 |
| 2009/0060503 A1 * | 3/2009 | Yin et al. | | 398/48 |
| 2010/0008665 A1 * | 1/2010 | Chen et al. | | 398/43 |

OTHER PUBLICATIONS

Telikepalli, et al., Storage Area Network Extension Solutions and their Performance Assessment; IEEE Communications Magazine; Apr. 2004; pp. 56-63.
Hitachi White Paper; Improving Business Resilience with Data Replication and Storage Area Network Extension Technology; http://www.hds.com/assets/pdf/wp-improving-business-resilience-with-data-replication-and-storage-area-network-extension-technology.pdf; Apr. 2007; 19 pages.
Ciena Inc, Whitepaper; Thinking storage network extension, http://www.fcw.com/vendorsolutions/THINK_Ciena-2-final2.pdf ; 2007; 2 pages.
Verizon News Release; http://newscenter.verizon.com/press-releases/verizon/2006/page.jsp?itemID=29670944; May 1, 2006; 3 pages.

* cited by examiner

*Primary Examiner* — Nathan Curs
*Assistant Examiner* — Tanya Ngo
(74) *Attorney, Agent, or Firm* — James Bitetto; Joseph Kolodka

(57) ABSTRACT

A storage area network extension, network and method include a storage terminal coupled to a remote node. The remote node is connected to a passive optical network (PON) for transferring data signals in the PON and storage signals to/from the storage terminal by employing subcarrier channels in the PON to enable concurrent bidirectional transfer of the data and the storage signals. A storage area network is coupled to the storage terminal and configured to store and retrieve the storage signals for transfer over the PON.

13 Claims, 2 Drawing Sheets

STORAGE AREA NETWORK EXTENSION OVER PASSIVE OPTICAL NETWORKS USING PARALLEL SIGNAL DETECTION

RELATED APPLICATION INFORMATION

This application claims priority to provisional application Ser. No. 60/971,369 filed on Sep. 11, 2007, incorporated herein by reference.

The present application is related to U.S. application Ser. No. 12/044,382, entitled "STORAGE OVER OPTICAL/WIRELESS INTEGRATED BROADBAND ACCESS NETWORK (SOBA) ARCHITECTURE", filed Mar. 7, 2008 and incorporated herein by reference.

BACKGROUND

1. Technical Field

The present invention relates to passive optical networks (PONs) and more particularly to a system and method for providing storage compatibilities in a PON in an efficient and low cost manner.

2. Description of the Related Art

A Storage Area Network (SAN) is a high-speed and special-purpose network that interconnects a set of storage devices with associated servers. A SAN transfers data between computer systems and storage elements. SAN architectures may be employed by large enterprises that have tremendous data to backup, consolidate or replicate among different branches.

After power outages, terrorist attacks and other occurrences where power is lost, SAN extension is emerging to ensure business continuity. SAN extension essentially requires a primary site and backup site to be apart up to hundreds of miles, so that only one site will be affected in the case of a disaster. SAN extension through a dedicated leased line, such as a fiber channel (FC), is cost-prohibitive, and thus unaffordable to medium and small businesses.

SAN systems have been implemented in communications and data service systems by employing a cost-prohibitive dedicated channel. A dedicated channel means that the equipment and resources needed to run that channel must also be provided. This includes reserving channel-related hardware or even laying an additional fiber optic line.

SUMMARY

A storage area network extension, network and method include a storage terminal coupled to a remote node. The remote node is connected to a passive optical network (PON) for transferring data signals in the PON and storage signals to/from the storage terminal by employing subcarrier channels in the PON to enable concurrent bidirectional transfer of the data and the storage signals. A storage area network is coupled to the storage terminal and configured to store and retrieve the storage signals for transfer over the PON.

An optical network includes a passive optical network (PON) configured to connect a core network with one of more local networks for the transfer of data signals, and a storage area network configured to share PON components for transferring storage signals by employing subcarrier channels in the PON to enable concurrent bidirectional transfer of the data and the storage signals.

A method for communication over a passive optical network (PON) includes transferring data signals over a passive optical network (PON) which connects a core network with one of more local networks, and transferring storage signals to and from a storage area network configured to share PON components by employing subcarrier channels in the PON such that concurrent bidirectional transfer of the data and the storage signals is enabled.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Passive optical networks (PON) are a low-cost solution to Gigabit-level broadband access. In accordance with the present principles, Storage Area Networks (SANs) are employed using low-cost PON technology. In one useful architecture, SANs are connected to a long-haul transmission network via subcarrier channels in PONs. Technologies, including subcarrier modulation (SCM) and parallel signal detection (PSD), are employed to enable the concurrent transmission of data and storage signals. The architecture inherits features of PONs, including affordable cost, high speed, as well as extendibility.

In accordance with one application, a storage service is added into an existing passive optical network (PON) infrastructure. Parallel signal detection (PSD) technology is preferably employed to carry storage transmissions using subcarriers. In this way, a geographically-distributed SAN becomes more affordable to small and medium enterprises. This new storage PON architecture leverages high-speed storage transmission and low-cost broadband access provisioning. SCM transmits storage service over existing PON architectures, and PSD is adopted to receive both data and storage signals by employing one photodetector (PD).

Using this new architecture, we have demonstrated error-free 2.5-Gb/s data and 2.5-Gb/s storage transmissions over 20-km single-mode fiber (SMF-28). As a result, local storage transmission in SANs can be extended into long-haul transmission over PONs, thus reducing the storage service expense.

Embodiments described herein may be entirely hardware, entirely software or including both hardware and software elements. In a preferred embodiment, the present invention is implemented in hardware in an optical network including software elements. Software may include but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

Figure 1:
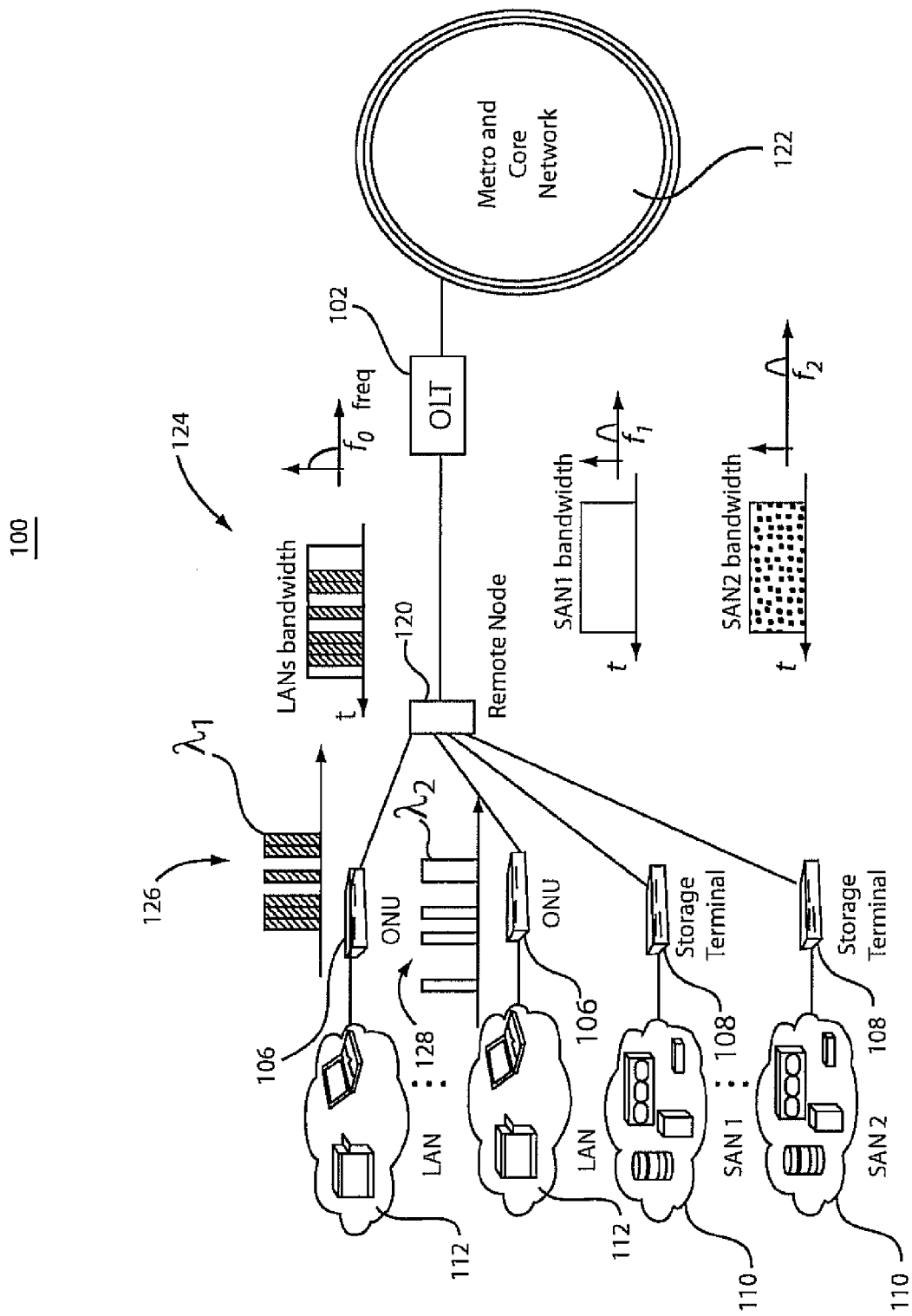
FIG. 1 is a diagram showing a storage area network extension on a passive optical network in accordance with one illustrative embodiment.

Referring now to the drawings in which like numerals represent the same or similar elements and initially to FIG. 1, a storage PON system 100 is illustratively shown in accordance with one exemplary embodiment. An optical line terminal (OLT) 102 handles both data and storage traffic transmission between a core (or metro) network 122 and local area networks 112 and storage area networks (SAMs) 110. In one embodiment, PON data is carried by baseband signals (e.g., frequency, $f_0$), and newly-added storage traffic is carried by passband signals (e.g., frequencies $f_1$ and $f_2$).

Data from regular PON users are delivered as specified by the existing PON standards. In the downstream direction from the OLT 102 to optical network units (ONUs) 106, time-division multiplexing (TDM) is employed in the baseband of downstream wavelength channel (say, $\lambda_1$) to broadcast data across the PON domain. This is illustratively depicted as local are network (LAN) bandwidth 124, which shows dedicated timeslots for each ONU 106. In the upstream direction from ONUs 106 to the OLT 102, time-division multiple access (TDMA) is an enabling scheme to share baseband bandwidth (126 and 128) of another wavelength channel (say, $\lambda_2$) among multiple ONUs 106.

Storage traffic is carried using subcarrier modulation technology. Downstream storage traffic to SAN1 and SAN2 (110) is up-converted to passbands $f_1$ and $f_2$, respectively. One SAN is serviced by a dedicated passband signal, ensuring storage data security. Similar to the downstream transmission, in the upstream, storage traffic from SANs are carried by passband signals.

SANs 110 may include a plurality of memory components, servers and storage devices for storing and retrieving information passed over the PON. It should be understood that the SANs 110 may be employed to selectively record some or all network data, metadata and any other useful information.

A remote node 120 in storage PON 100 keeps conventional functionalities, splitting signals in the downstream and coupling signals in the upstream. At the OLT 102, one photodetector (PD) (not shown) is employed to detect both of the data and storage signals from the optical carrier. Following the PD, a low-pass filter and a band-pass filter are adopted to separate the baseband data and SCM storage signals, respectively. As a result, the storage service can be facilitated by using the existing PON architecture. The PD receives multiple frequencies and filters are employed to distinguish between the different frequencies (using PSD).

Figure 2:
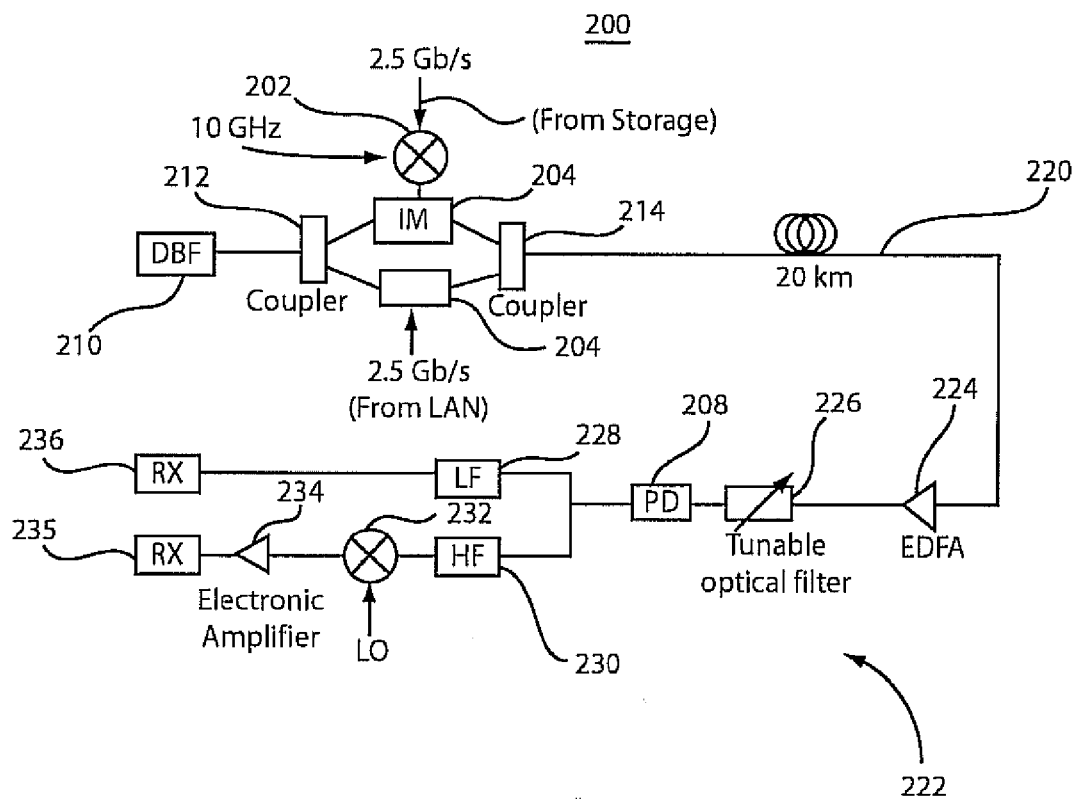
FIG. 2 is a schematic diagram showing an illustrative embodiment used in a test setup in accordance with the present principles.

Referring to FIG. 2, a testbed setup 200 shows one illustrative embodiment implemented in accordance with the present principles. One wavelength is employed to carry the 2.5-Gb/s data from a LAN, and 2.5-Gb/s storage traffic from a SAN (storage) in the upstream direction. An optical signal having the single wavelength from a laser (e.g., a distributed feedback laser (DFB)) 210 is split using a splitter/coupler 212. The storage signal is mixed by a mixer 202 with a 10 GHz carrier before the signals are used to drive modulators 204 (e.g., including an intensity modulator (IM)) to generate a subcarrier multiplexing signal. The modulated data and storage signals are coupled by a coupler 214 and sent down a fiber 220 to an OLT 222.

The OLT 222 includes one photodetector (PD) 208 is employed after an Erbium Doped Fiber Amplifier (EDFA) 224 and a tunable optical laser 226 to receive both data and storage signals. A low-pass (LP) filter 228 is further employed for data signal receiving. To receive the storage signal, a high-pass (HP) filter 230, a 10 GHz mixer 232 (which received a local oscillator (LO) signal), and an electronic amplifier 234 are employed. The data and storage signals are received by receivers 236 and 235, respectively. Note that the devices and configuration shown are illustrative and other device types and configurations may be employed in accordance with the present principles.

Figure 3:
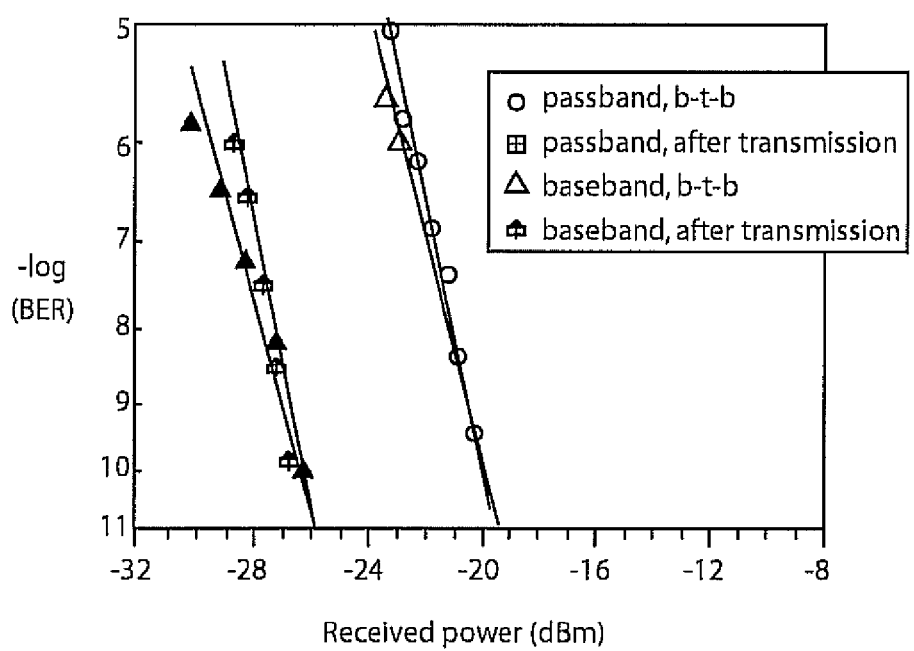
FIG. 3 is a graph showing bit error rate verses received power (log-log) for the test setup configuration of FIG. 2.

Referring to FIG. 3, bit error rate (BER) versus received power for the setup shown in FIG. 2 to conduct a SAN extension over PONs is illustratively depicted. The SAN extension maintains the broadband access service of conventional PONs, while adding the new feature of storage signal transmission. The BER measurement results show that both data and storage signals show small power penalties after 20 km transmission. The experimental results demonstrate that by employing the low-cost electric filters, the baseband data signal and the modulated storage signal are correctly detected simultaneously at the OLT side, and thus, the extended storage service can be provided by using the widely-deployed PON access network architecture.

Having described preferred embodiments of a system and method storage area network extension over passive optical networks using parallel signal detection (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A storage area network extension, comprising:
a storage terminal coupled to a remote node, the remote node being connected to a passive optical network (PON) for transferring data signals in the PON and storage signals to/from the storage terminal by employing subcarrier channels in the PON to enable concurrent bidirectional transfer of the data and the storage signals, wherein the data signals are multiplexed on a baseband signal using time division multiplexing and wherein the storage signals are carried by dedicated passband signals to provide storage data security; and
a storage area network coupled to the storage terminal and configured to store and retrieve the storage signals for transfer over the PON,
wherein the PON includes an optical line terminal (OLT) configured to employ subcarrier modulation (SCM) and parallel signal detection (PSD) to enable the concurrent transmission of the data and the storage signals.

2. The extension as recited in claim 1, wherein the OLT includes a single photo detector to employ parallel signal detection (PSD) for all subcarriers and at least one filter coupled to the photodetector to distinguish received signals.

3. The network as recited in claim 1, further comprising at least one optical network unit (ONU) coupled to a local network to receive and transmit the data signals to and from the OLT.

4. The network as recited in claim 3, wherein the data signals are modulated using time division multiplexing (TDM) and time division multiple access (TDMA) between the ONU and the OLT.

5. The network as recited in claim 1, further comprising a plurality of optical network units (ONU), each ONU employing a different subcarrier wavelength for transferring data signals.

6. An optical network, comprising:
- a passive optical network (PON) configured to connect a core network with one of or more local networks for the transfer of data signals multiplexed on a baseband signal using time division multiplexing; and
- a storage area network configured to share PON components for transferring storage signals carried by dedicated passband signals to provide storage data security by employing subcarrier channels in the PON to enable concurrent bidirectional transfer of the data and the storage signals,
- wherein the PON includes an optical line terminal (OLT) configured to employ subcarrier modulation (SCM) and parallel signal detection (PSD) to enable the concurrent transmission of the data and the storage signals.

7. The network as recited in claim 6, wherein the OLT includes a single photo detector to employ parallel signal detection (PSD) for all subcarriers and at least one filter is employed to distinguish signals.

8. The network as recited in claim 6, further comprising at least one optical network unit (ONU) coupled to a local network to receive and transmit the data signals.

9. The network as recited in claim 6, wherein the data signals are modulated using time division multiplexing (TDM) and time division multiple access (TDMA) between the ONU and the OLT.

10. The network as recited in claim 6, further comprising a plurality of optical network units (ONU), each ONU employing a different subcarrier wavelength for transferring data signals.

11. A method for communication over a passive optical network (PON), comprising:
- transferring data signals multiplexed on a baseband signal using time division multiplexing over a passive optical network (PON) which connects a core network with one or more local networks; and
- transferring storage signals carried by dedicated passband signals to provide storage data security to and from a storage area network configured to share PON components by employing subcarrier channels in the PON such that concurrent bidirectional transfer of the data and the storage signals is enabled,
- wherein the PON includes an optical line terminal (OLT) configured to employ subcarrier modulation (SCM) and parallel signal detection (PSD) to enable the concurrent transmission of the data and the storage signals.

12. The method as recited in claim 11, further comprising modulating/demodulating data signals using time division multiplexing (TDM) and time division multiple access (TDMA) respectively.

13. The method as recited in claim 11, further comprising a plurality of optical network units (ONU), each ONU employing a different subcarrier wavelength for transferring data signals.

* * * * *